(12) United States Patent
Dash

(10) Patent No.: US 7,609,278 B1
(45) Date of Patent: Oct. 27, 2009

(54) DETECTING BACKWARD MOTION REPRESENTED BY A PATH

(75) Inventor: Sambit Kumar Dash, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 1223 days.

(21) Appl. No.: 10/633,436

(22) Filed: Jul. 31, 2003

(51) Int. Cl.
G09G 5/00 (2006.01)
G06T 11/20 (2006.01)

(52) U.S. Cl. .................. 345/619; 345/442; 345/418

(58) Field of Classification Search .......... 345/619, 345/442, 179, 418; 715/863
See application file for complete search history.

(56) References Cited

U.S. PATENT DOCUMENTS 6,239,792 B1 * 5/2001 Yanagisawa et al. ........ 345/179
7,006,711 B2 * 2/2006 Dresevic et al. ............ 382/299
2005/0074165 A1 * 4/2005 Hamburg .................... 345/676

OTHER PUBLICATIONS

Adobe Systems Incorporated, "Using the lasso, polygonal lasso, and magnetic lasso tools", Adobe Photoshop 7.0 User's Guide, 2002, 5 pages.

* cited by examiner

Primary Examiner—Chante Harrison
(74) Attorney, Agent, or Firm—Fish & Richardson P.C.

(57) ABSTRACT

Methods, systems, and apparatus, including computer program products, for processing graphical input. Input that specifies a path is received. The path includes multiple locations ordered along the path. A tracking zone is specified for each of the multiple locations based on the location and a previous location preceding the location along the path, where the tracking zone indicates a direction of the path at the location. A backward motion is detected between a first and a second location in the path if the first location's tracking zone overlaps with the second location's tracking zone. If a backward motion is detected between the first and second locations, a portion of the path connecting the first location to the second location can be replaced.

73 Claims, 5 Drawing Sheets

DETECTING BACKWARD MOTION REPRESENTED BY A PATH

BACKGROUND

The present invention relates to processing graphical input in computer applications.

Many computer applications receive and process graphical input, i.e., input values that specify locations in an input space having two or more dimensions. For example, with a pointing device, such as a mouse, a trackball, or a stylus, a user can generate graphical input in a two-dimensional space corresponding to a display screen. The generated graphical input is typically described in units corresponding to pixels of the screen.

The graphical input can be used to interact with a user. For example, a computer application can display one or more menu items on a screen and receive graphical input from a pointing device to select one of the displayed items. In addition, graphical input can specify a path in the input space. For example in drawing and painting applications, a user can draw or paint a path by specifying a sequence of input points, e.g., by moving a mouse or a stylus. The drawing or painting application can define the path based on the sequence of input points. For example, the application can fit a curve on the input points, interpolate between two subsequent input points, or filter the input points to define the path.

The defined path can be further processed by the same or another application. For example, a drawn path can be displayed on the screen in a drawing application, and a user-assisted partial undo can be effected by allowing a user to press a control key to indicate that future graphical input will be for path-deletion operations. In addition, graphical input can be processed to infer backward motion by calculating path directions at different input points using a few other input points that precede and/or follow the input points of interest.

Processing graphical input is particularly important in handheld devices, such as personal digital assistants ("PDA"), that use pointing devices, e.g., a stylus, to receive user input. Often, these devices rely mostly on graphical input and have only a limited keyboard or no keyboard at all. For example, a PDA can use a virtual keyboard, i.e., a keyboard that is displayed on the screen. In addition, most PDAs can process graphical input, such as handwriting.

SUMMARY

The invention provides systems and techniques for detecting backward motion represented by a path and replacing a portion of the path corresponding to the backward motion. In general, in one aspect, the invention provides methods and apparatus, including computer program products, for processing graphical input. The method includes receiving input specifying a path that includes multiple locations ordered along the path. For each of the multiple locations, a tracking zone is specified based on the location and a previous location preceding the location along the path, where the tracking zone indicates a direction of the path at the location. A backward motion is detected between a first and a second location in the path if the first location's tracking zone overlaps with the second location's tracking zone.

Particular implementations can include one or more of the following features. The path can include a starting location, and a tracking zone can be specified for the starting location. The first location's tracking zone and the second location's tracking zone can be evaluated to verify whether the first tracking zone overlaps with the second tracking zone. For each of the multiple locations along the path, the location can be associated with a corresponding influence region having a predefined shape. The influence region can represent a paintbrush. Specifying a tracking zone for a location based on the location and a previous location in the path can include specifying a tracking zone that is inside the influence region of the location and outside the influence region of the previous location.

A portion of the path can be deleted if a backward motion is detected between the first and second locations, where the deleted portion of the path connects the first location to the second location and includes one or more of the multiple locations in the path. Receiving input specifying a path can include receiving two or more input points. The multiple locations in the path can be specified based on the two or more input points. Specifying the multiple locations in the path can include interpolating between two input points. Receiving input points can include receiving two or more input points in a two dimensional space and/or two or more input points in a three dimensional space. The path can be presented on a surface. The multiple locations in the path can include contiguous raster points. When the first location precedes the second location along the path, deleting a portion of the path can include deleting the first location from the path. A new portion of the path can be defined, where the new portion replaces the deleted portion. A tracking zone can be specified for each of the new locations. A new tracking zone can be specified for the second location. Receiving input can include receiving user input from a pointing device.

In general, in another aspect, the invention provides a system for processing graphical input. The system includes an interface and a backward motion detector. The interface receives input that specifies a path including multiple locations. The backward motion detector specifies a tracking zone for each location in the path based on the location and a previous location preceding the location along the path, and detects a backward motion if two of the specified tracking zones overlap.

Particular implementations can include one or more of the following features. The interface can include a pointing device to generate the input specifying the path. The system can include a drawing component that corrects the path if a backward motion is detected. The system can include a non-drawing component that receives a notification from the backward motion detector if a backward motion is detected.

The invention can be implemented to realize one or more of the following advantages. A backward motion represented by a path can be detected without complicated mathematical calculations, such as calculating and statistically evaluating tangents along the path. The backward motion can be detected in a raster device where a path can have only a discrete set of directions. A path can be corrected by a backward motion. For example, in a drawing or painting application, a user can draw or paint a curved path and delete or correct a portion of the path without deleting the entire path, or using an eraser application, a keyboard, or any other control key. The path can be drawn and corrected with the same stroke, e.g., without lifting a stylus. A portion of a drawn path can be deleted without exactly tracking the drawn path.

The details of one or more implementations of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
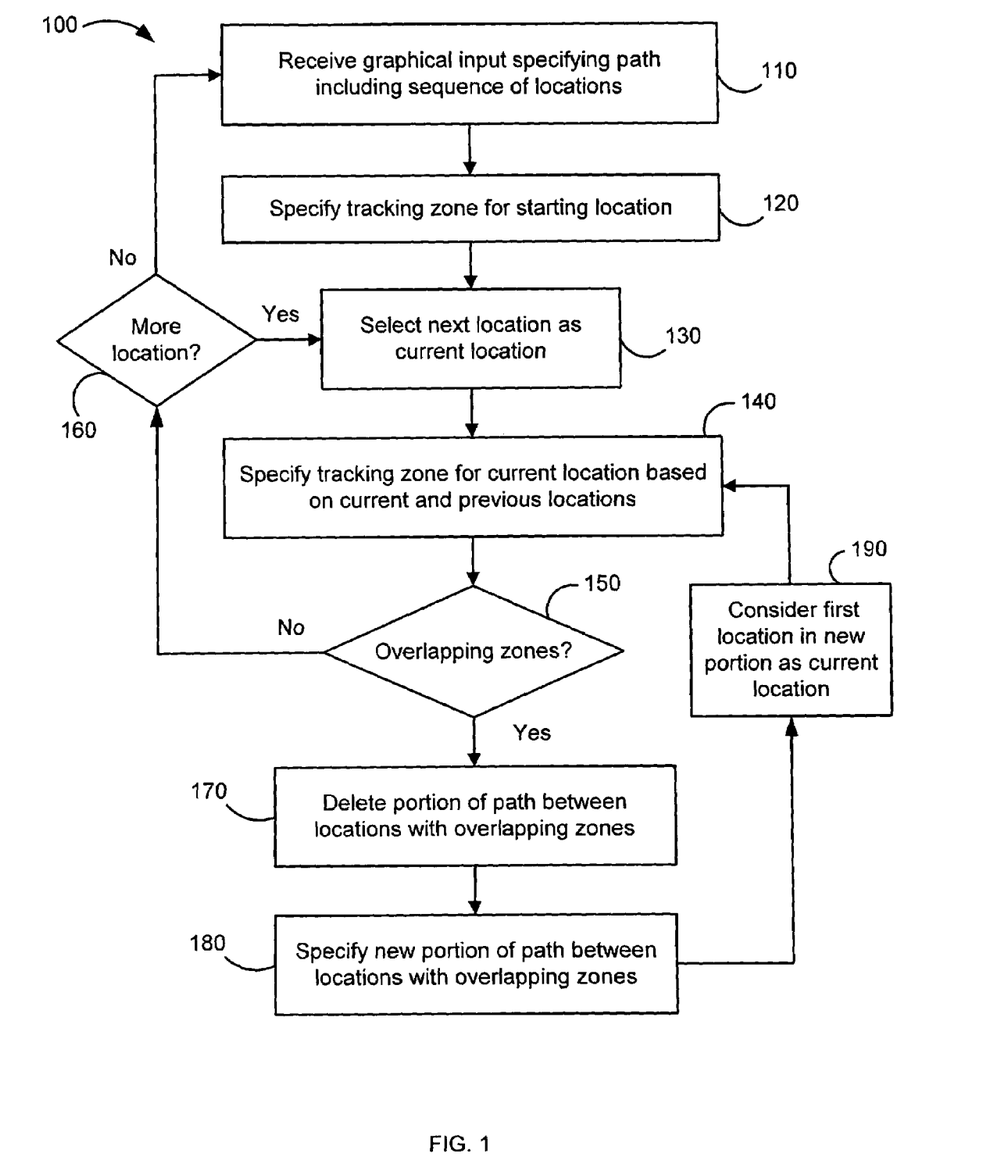
FIG. 1 is a schematic flow diagram showing a method for detecting backward motion to correct a path.

FIG. 1 shows a method 100 for detecting backward motion to correct a path. The method 100 can be performed by a computer system, e.g., a PDA, in which one or more computer applications are configured to process graphical input.

The system receives graphical input specifying a path that includes a sequence of locations along the path (110). In one implementation, the received graphical input represents user input generated by a pointing device. For example, a user can use a drawing or painting application, or handwrite on a digitizing tablet or a touch screen, e.g., that of a PDA. Alternatively, the received graphical input can be automatically generated by another computer application without any assistance from a user. For example, the other application can monitor a moving object or evaluate a mathematical formula that specifies the path.

The received graphical input can include input points or other input, e.g., one or more mathematical formulas, that specify a path in an input space having two or more dimensions. For example, the input space can have two dimensions corresponding to a display screen or three dimensions where a third dimension can describe, e.g., a third spatial dimension, a time parameter, or a dimension in an abstract mathematical space. Optionally, the input surface can be a curved two-dimensional surface that is embedded in a three dimensional space. In one implementation, the curved surface is described by two coordinates that identify locations in the curved surface and can be handled the same way as coordinates in a flat surface.

The path can be specified by a sequence of input points. In two or more dimensions, each input point can be identified by multiple input values. For example, an x input value and a y input value can form a pair to identify an input point in two dimensions. Optionally, the path can be specified using a mathematical formula. For example, the path can be specified by a starting location in the input space and a mathematical formula describing how further locations of the path can be generated from the starting location. For example, the mathematical formula can define a mapping that maps a location in the path to a next location in the path. In one implementation, the mathematical formula can describe a path having a fractional dimension.

The specified path includes a sequence of locations along the path. The sequence of locations can include the input points specifying the path. Alternatively or in addition, the path can include locations calculated based on the specified path. In one implementation, the input space is a pixel array where two subsequent input points can be multiple pixels away from each other. Based on the input points, the system can interpolate between the subsequent input points, e.g., using Bresenham's line algorithm, to identify pixels that belong to the path. In alternative implementations, the system can calculate the path based on the input points and identify the sequence of locations along the path without including the input points. For example, the system can fit a curve on the input points to specify the path and identify a sequence of locations along the path. For example, the identified locations can be pixels that belong to the path in a pixel array. Optionally, the locations can be equally spaced in one or more directions, or along the path.

The system specifies a tracking zone for a starting location (120), selects a next location in the sequence of locations as a current location (130), and specifies a tracking zone for the current location (140). A tracking zone is a region that is associated with a location in the path to track how the path has moved to the location. For a starting location, the tracking zone can be independent of any direction of the path. For a location preceded by a previous location along the path, a tracking zone can depend on the previous location. Optionally, a tracking zone of a location can depend on one or more locations that follow the location along the path.

Figure 2A:
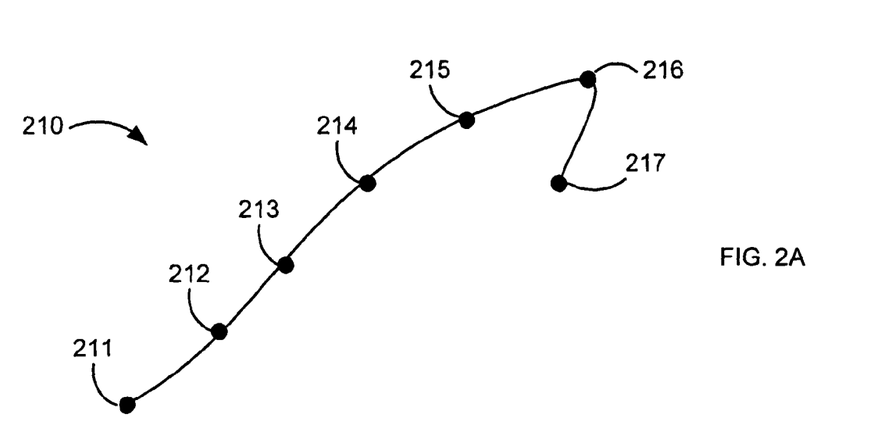
FIGS. 2A-2F are schematic diagrams illustrating an exemplary implementation of correcting a path.

In one implementation, the tracking zone is a region in the input space where the path is specified. Alternatively, the tracking zone can be a region in another space, such as a space onto which the input space is projected. For example, the input space can be a three dimensional space that is projected onto a two-dimensional space, e.g., a display screen, and tracking zones can be specified in the three dimensional space and/or the two dimensional space. Exemplary tracking zones are discussed with reference to FIGS. 2A-3.

In one implementation, specifying tracking zones is based on influence regions of the locations in the path. An influence region is a limited region around a location. For example, a size for the influence region can be defined by a distance from the location. The distance can be measured according to a metric in a space where the path is specified. For example in a pixel array, the distance can be measured in numbers of pixels. In one implementation, the influence region has a symmetry about the location. Thus, the distance defining the influence region can be independent of directions allowed in the space (e.g., the influence region can be a circle in a space that allows continuous variation of directions, or a square in a rectangular pixel array that allows only eight directions). Alternatively, the influence region can be non-symmetric.

In one implementation, an influence region corresponds to a tracking paintbrush that is placed at the location. That is, the influence region is defined as a region that can be painted with the tracking paintbrush that is placed at the location. For example in a painting application, the tracking paintbrush can be an "actual" paintbrush that is used to paint the path at the location. Alternatively, the system can define the tracking paintbrush as a "virtual" paintbrush that is used to specify tracking zones and not to paint the path. For example in a pixel array, a single-pixel paintbrush can paint the path as a line of contiguous pixels, and each pixel of the line can have an influence region including multiple pixels and corresponding to a virtual paintbrush.

For a starting location, a tracking zone can be specified to match an influence region of the starting location. For example, the tracking zone can be a region that can be painted with a tracking paintbrush placed at the starting location. In one implementation, the tracking zone matches a symmetric influence region that is defined by the same distance in all directions allowed in the input space. Alternatively, a non-symmetric tracking zone can be specified for the starting location based on a non-symmetric influence region. Optionally, a tracking zone can be specified for the starting location based on one or more next locations along the path.

For a current location immediately preceded by a previous location along the path, a current tracking zone can be specified based on influence regions of the current location and the previous location. For example, the current tracking zone can be defined as a difference between the influence zone of the current location and the influence zone of the previous location. That is, the current tracking zone does not include the influence region of the immediately preceding location. In addition, the current tracking zone can include any region that is painted when a tracking paintbrush (actual or virtual) moves from the previous location to the current location. FIGS. 2A-2F show exemplary implementations of specifying tracking zones based on influence regions.

Figure 3:
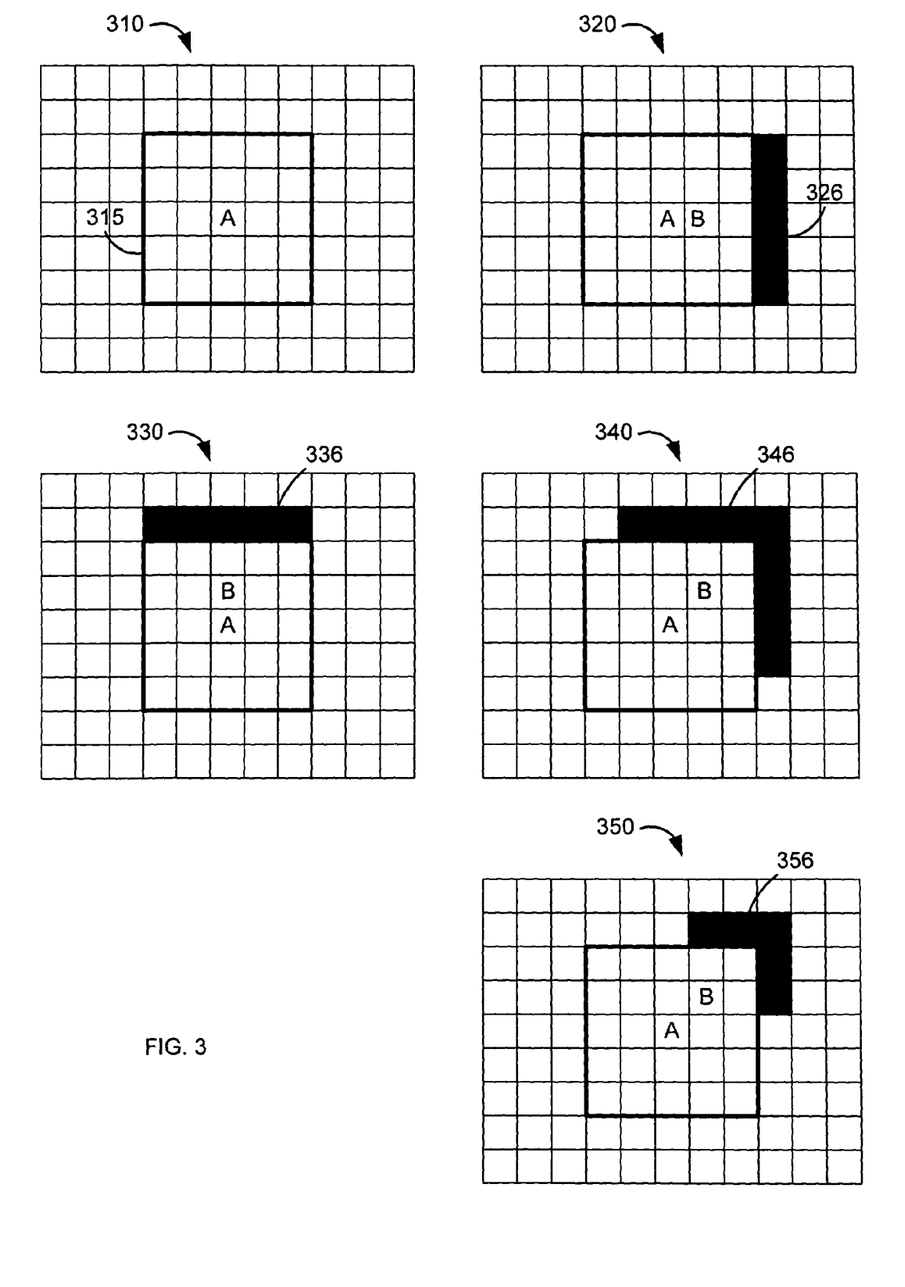
FIG. 3 is a schematic diagram illustrating exemplary definitions of tracking zones for detecting backward motion of a path in a pixel array.

In alternative implementations, the system can specify tracking zones without using influence regions. For example, tracking regions can have predefined properties, such as shape and relative position from a corresponding location. The predefined properties can depend, e.g., on a direction between a current location and a previous location immediately preceding the current location in a sequence of locations. For example in a rectangular pixel array, a path can include a sequence of neighboring pixels. For two subsequent pixels, there can be eight possible directions, and the system can predefine a tracking zone corresponding to each of these directions. Optionally, the predefined tracking zones can be based on influence regions. FIG. 3 shows exemplary implementations of defining tracking zones for a pixel array.

To detect a backward motion represented by the path, the system verifies whether the current tracking zone overlaps with a tracking zone specified for any of the previous locations preceding the current location along the path (decision 150). In one implementation, the system stores the tracking zone of each previous location and compares each of the previous tracking zones with the current tracking zone to detect whether they overlap. For example in a pixel array, the system can store a bitmap of each tracking zone (digital ones representing pixels inside and digital zeros representing pixels outside the zone), compare two of the tracking zones by performing a boolean AND operation at each pixel, and detect an overlap if the AND operation gives a digital one at least for one pixel. Alternatively, the system can keep a record for each pixel, e.g., in an array, where the record indicates whether the pixel is included in a tracking zone, and detect an overlap if the records show that a pixel in the current tracking zone is also included in another tracking zone. In the array, the records can indicate for each pixel in a tracking zone the location that corresponds to the tracking zone using an identifier, e.g., a bitmap address.

If no overlap is found ("No" branch of decision 150), no backward motion is detected and the system verifies whether there is at least one location along the path after the current location (decision 160). If there is at least one location remaining along the path ("Yes" branch of decision 160), the system selects the next remaining location as a new current location (i.e., returns to 130). If no locations remain along the path ("No" branch of decision 160), the system receives new graphical input (i.e., returns to 130). In alternative implementations, the method can stop if no locations remain along the path.

If an overlap is found between the current tracking region and a tracking region of a previous location ("Yes" branch of decision 150), the system has detected a backward motion. Accordingly, the system deletes a portion of the path between the current location and the previous location whose tracking zone overlaps with the current tracking zone (170). In one implementation, the system deletes from the path all locations that are in-between the current location and the overlapping previous location. Optionally, the system can delete the overlapping previous location from the path as well. By deleting the overlapping previous location, the system can eliminate the overlap between the previous and current locations, e.g., if tracking zones are predefined. Alternatively, the overlap can be eliminated without deleting the overlapping previous location by specifying a new, non-overlapping tracking zone for the current location.

A new portion of the path is specified between the current location and the overlapping previous location (180). In one implementation, the system specifies one or more new locations in the path between the current location and the overlapping previous location. For example, the system can interpolate between the current location and the overlapping previous location to specify the new locations, e.g., using Bresenham's line algorithm. (In a pixel array, the new locations can include all pixels in a sequence of neighboring pixels that connect the overlapping previous location to the current location.) In an alternative implementation, the new portion of the path can be specified without specifying new locations in the path. That is, the new portion of the path is defined only by the overlapping previous location and the current location. In implementations, where the overlapping previous location is deleted from the path if backward motion is detected, the system can specify new locations by interpolating between the current location and the location that preceded the overlapping previous location.

A first location in the new path portion is considered as a new current location (190). That is, the new location following the overlapping location is considered as the current location if the overlapping location has not been deleted from the path. If the overlapping previous location has been deleted, the current location is the new location following the location that preceded the overlapping location. If no new locations have been specified, the new and old current locations will be the same. For the new current location, the system specifies a tracking zone (i.e., returns to 140), and the method 100 continues.

In alternative implementations, the system can receive additional input or perform additional evaluations to decide whether a detected backward motion is intended to correct a path or not. For example, a user can use a key or a mouse button to switch on or off path correction based on backward motion. Alternatively, the system can set a range from the current location within which overlapping tracking regions signal backward motion, and outside the range backward motion is not detected. Alternatively or in addition, the system can specify seed points along the path. At locations preceding a last seed point, the path cannot be corrected with a backward motion. In one implementation, seed points can be defined as locations that survived a predetermined number of backward motions without being deleted.

Furthermore, the system can detect backward motion for other purposes than correcting a path. In one implementation, backward motion is detected in a user interface, e.g., to select a function or items from a menu. For example, a particular region of the input space, e.g., a rectangle displayed on a screen, can correspond to an item of the menu. To select the menu item, a user can draw a path that represents one or more backward motions in the particular region (e.g., the user can put a sharp checkmark in the displayed rectangle). Alternatively or in addition, the user can delete a displayed object (or quit an application represented by a displayed object) by drawing a path over the displayed object with repeated backward-forward motion (i.e., scratching out the object).

Figure 2B:
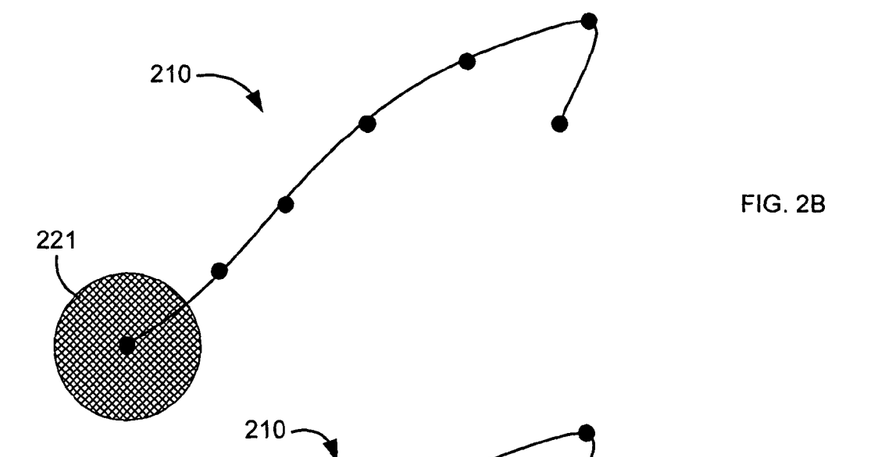

FIGS. 2A-2F show an exemplary implementation of detecting backward motion represented by a path 210, e.g., using the method 100 discussed above with reference to FIG. 1. The path 210 is defined in a two dimensional input space, and includes a sequence of locations 211-217, where location 211 is a starting location and location 217 is a last location of the path 210. As shown in FIG. 2B, a tracking zone 221 is specified for the starting location 211. The tracking zone 221 corresponds to a circular influence region around the location 211. In alternative implementations, the influence region can have any other shape, e.g., can be rectangular or hexagonal.

Figure 2C:
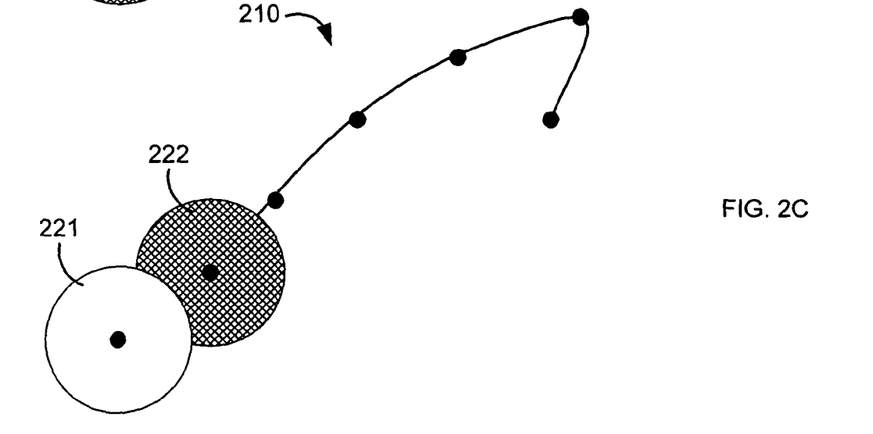

As shown in FIG. 2C, a tracking region 222 is specified for the second location 212. The tracking region 222 is a difference between the influence region of the second location 212 and the influence region of the starting location 211. Accordingly, the tracking region 222 of the second location is guarantied not to overlap with the tracking region 221 of the starting location 211. In alternative implementations, instead of influence zones, tracking regions can be based on a relative orientation of subsequent locations in the path. For example, tracking regions can have a predefined shape that is oriented according to the relative orientation of the subsequent locations.

Figure 2D:
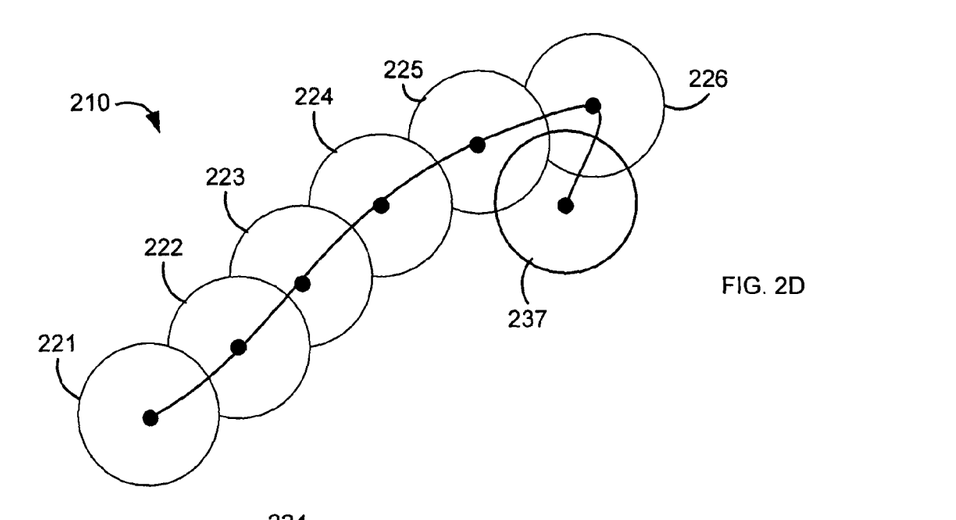

As shown in FIG. 2D, tracking regions 223-226 can be specified for the locations 113-116, respectively, based on influence regions of subsequent pairs of locations along the path. For example, the tracking region 223 is specified as the difference between the influence regions of the locations 113 and 112. The tracking regions 223-226 do not overlap with any previous tracking region along the path 210. Accordingly, no backward motion is detected between the starting location 211 and the location 216.

An influence region 237 of the last location 217 is overlapping with the influence regions of the previous locations 116 and 115. Therefore, if a tracking zone is specified for the last location 117 as a difference between the influence region 237 and the influence region of the location 116, such tracking zone will overlap with the tracking zone 225 of the location 115. Accordingly, a backward motion is detected between the overlapping location 115 and the last location 117.

Figure 2E:
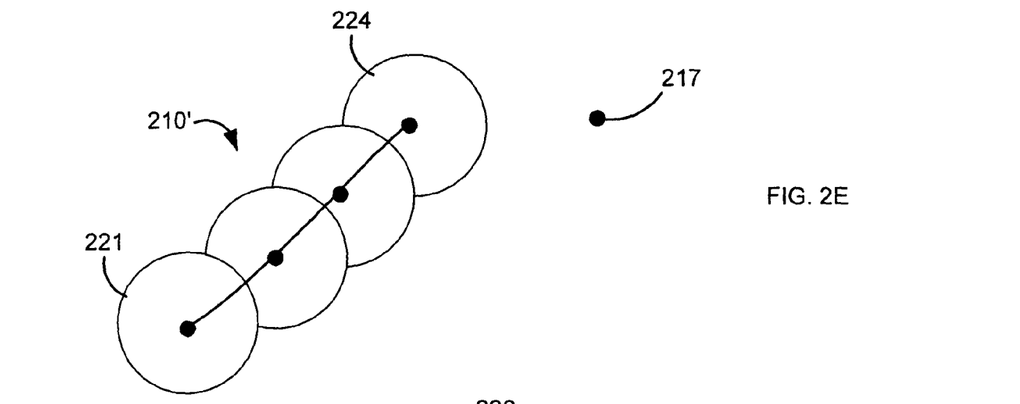

As shown in FIG. 2E, due to the backward motion, a portion is deleted from the path 210. The deleted portion includes the overlapping location 215 and the location 216, which is between the overlapping location 115 and the last location 117. After the deletion, a remaining path 210' includes the locations 211-214, i.e., the remaining path 210' ends at the location 214, which has a non-overlapping tracking zone. In an alternative implementation, only the location 216 is deleted from the path and the remaining portion ends at the overlapping location 215. The last location 217 of the path 210 is not deleted.

Figure 2F:
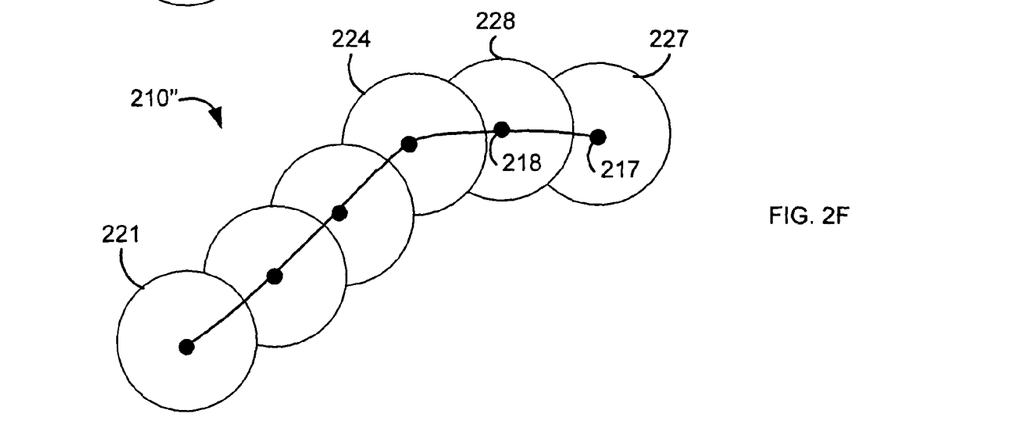

As shown in FIG. 2F, a new portion can be specified for the remaining path 210' to generate a modified path 210". The new portion connects the location 214, i.e., a last location of the remaining path 210', to the last location 217 of the path 210, and includes a new location 218 between the locations 214 and 217. For example, the new location 218 can be specified in the path by interpolating between the locations 214 and 217. The modified path 210" includes a modified sequence of locations specifying an order 211-214, 218, and 217 for the locations in the path. Tracking zones 228 and 227 can be specified for the locations 218 and 217, respectively, the same way as for the previous locations along the path.

FIG. 3 shows exemplary tracking zones defined in pixel arrays 310, 320, 330, 340, and 350. In a pixel array, a path can be defined by a sequence of neighboring pixels. At a current pixel, a direction can be defined based on a location of a previous pixel neighboring the current pixel. For example in a rectangular pixel array, a direction can be defined for each of eight neighboring locations of a pixel, and each direction can have a corresponding predefined tracking zone. With the techniques discussed with reference to FIG. 1, the predefined tracking zones can be used to detect backward motion represented by a path that includes a sequence of neighboring pixels.

In the pixel array 310, a pixel A has an influence region 315 defined by a five pixel times five pixel region around the pixel A. For example, the influence region 315 can be a region that is painted by a paintbrush placed at the pixel A. In one implementation, pixel A is a starting location of a path and the influence region 315 is a tracking zone specified for the pixel A.

In the pixel arrays 320, 330, 340 and 350, exemplary tracking zones are defined for directions represented by neighboring pixels A and B and pointing from pixel A to pixel B. In the pixel array 320, an exemplary tracking zone is defined for a horizontal direction, i.e., when a path moves right from a pixel A to pixel B. A tracking zone 326 is defined for the move to the right. The tracking zone 326 is associated with the pixel B, and corresponds to a difference between influence regions of pixels A and B. An analogous tracking zone can be defined for a path moving to the left.

In the pixel array 330, an exemplary tracking zone is defined for a vertical direction, i.e., when a path moves up from a pixel A to pixel B. A tracking zone 336 is defined for the up move of the path. The tracking zone 336 is associated with the pixel B, and corresponds to a difference between influence regions of pixels A and B. An analogous tracking zone can be defined for a down moving path.

In the pixel array 340, an exemplary tracking zone is defined for a diagonal direction, i.e., when a path moves in an up-right direction from a pixel A to pixel B. A tracking zone 346 is defined for the up-right move of the path. The tracking zone 346 is associated with the pixel B, and corresponds to a difference between influence regions of pixels A and B. An analogous tracking zone can be defined for other diagonal directions of the path.

In alternative implementations, a tracking zone can be a predefined zone that is not defined as a difference of influence regions. For example, in the pixel array 350, an alternative tracking region 356 is defined for an up-right diagonal move. The tracking region 356 is associated with pixel B but is not related to an influence zone around pixel B.

Figure 4:
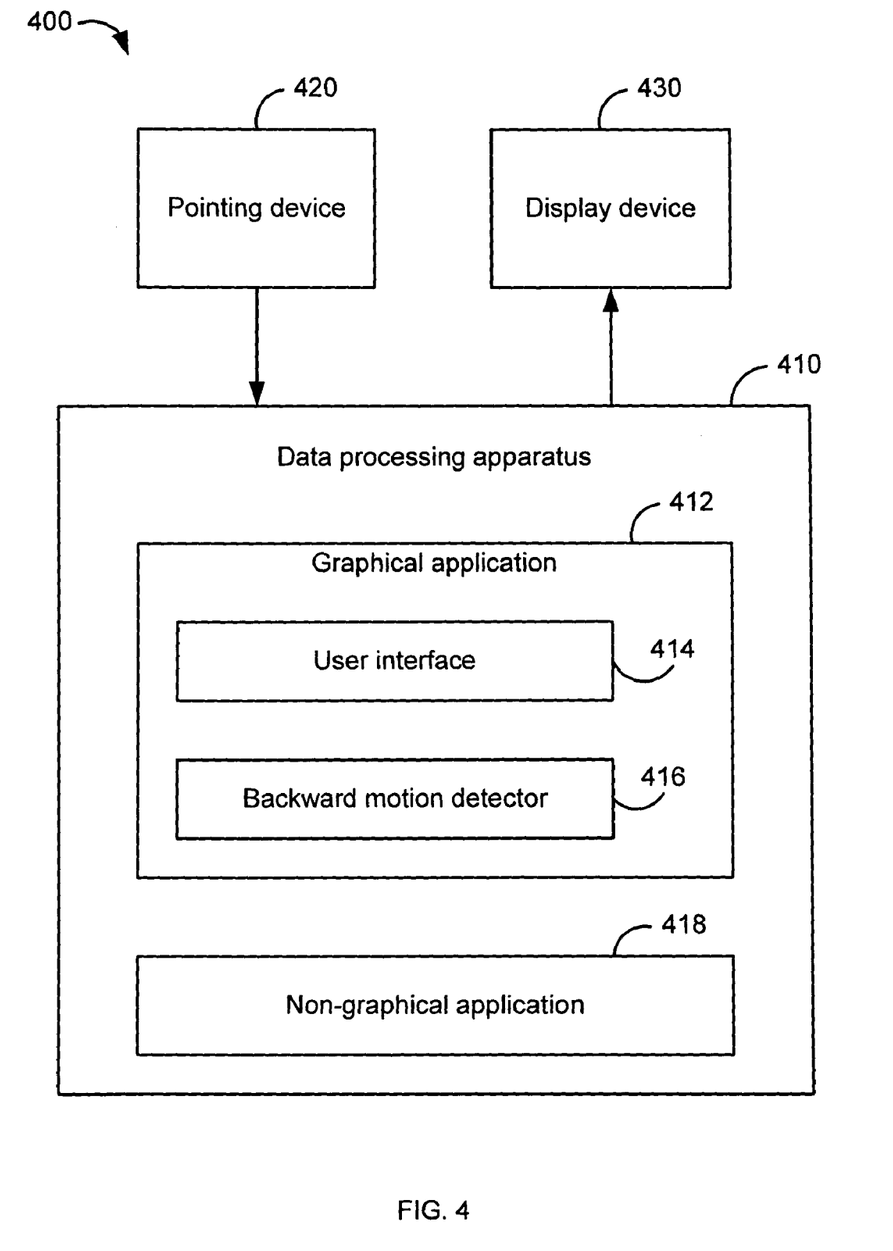
FIG. 4 is a schematic diagram illustrating an exemplary system using backward motion detection to process user input.

FIG. 4 shows an exemplary system 400 that uses backward motion detection to process user input. The system 400 includes a data processing apparatus 410, a pointing device 420, and a display device 430. The data processing apparatus 410 can be a desktop computer or a handheld device, such as a PDA. The data processing apparatus 410 receives user input from the pointing device 420 and displays output, including graphical output, to the user on the display device 430. Optionally, the pointing 420 and display 430 devices can be implemented in a single device, such as a touch screen.

The data processing apparatus 410 includes a graphical application 412 and a non-graphical application 418. For example, the graphical application 412 can be a drawing or a painting application, and/or provide graphical user interface for the non-graphical application 418. The graphical application 412 includes a user interface 414 and a backward motion detector 416. The user interface 414 can receive graphical input from the pointing device 420 and uses the display device 430 to display graphical data to the user.

In one implementation, the user interface 414 receives graphical input specifying a path. For example, the user can draw a curve in an input space with the pointing device 420, and the user interface 414 can receive one or more input points of the curve. Based on the received input points, the graphical application 412 can specify a path corresponding to the curve. The specified path can include multiple locations. For example, the graphical application can interpolate and/or filter the input points to specify the locations in the path.

The backward motion detector 416 can evaluate the locations in the path to detect a backward motion represented by the path. In one implementation, the backward motion detector 416 specifies a tracking zone for each location in the path, and evaluates the tracking zones. Tracking zones can be specified, e.g., using the techniques discussed above with reference to FIGS. 1-3. The backward motion detector 416 detects a backward motion if two locations' tracking zones overlap. If a backward motion is detected, the graphical application 412 can delete and replace a portion of the path, as discussed above with reference to FIGS. 1-2F. Alternatively, the graphical application 412 can signal to the non-graphical application 418 that a backward motion is detected and the non-graphical application 418 can take a corresponding action.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

By way of example, a printing device implementing an interpreter for a page description language, such as the PostScript® language, includes a microprocessor for executing program instructions (including font instructions) stored on a printer random access memory (RAM) and a printer read-only memory (ROM) and controlling a printer marking engine. The RAM is optionally supplemented by a mass storage device such as a hard disk. The essential elements of a computer are a processor for executing instructions and a memory. A computer can generally also receive programs and data from a storage medium such as an internal disk or a removable disk. These elements will also be found in a conventional desktop or workstation computer as well as other computers suitable for executing computer programs implementing the methods described here, which can be used in conjunction with any digital print engine or marking engine, display monitor, or other raster output device capable of producing color or gray scale pixels on paper, film, display screen, or other output medium.

The invention has been described in terms of particular embodiments. Other embodiments are within the scope of the following claims. For example, the steps of the invention can be performed in a different order and still achieve desirable results.

What is claimed is:

1. A method, comprising:
   receiving input specifying a path including a plurality of locations ordered along the path;
   for each location in the plurality of locations, specifying a tracking zone based on the location and a previous location preceding the location along the path, the tracking zone indicating a direction of the path at the location; and
   detecting a backward motion between a first and a second location in the path if the first location's tracking zone overlaps with the second location's tracking zone;
   wherein the receiving, the specifying and the detecting are performed by data processing apparatus.

2. The method of claim 1, wherein the path further includes a starting location, the method further comprising:
   specifying a tracking zone for the starting location.

3. The method of claim 1, further comprising:
   evaluating the first location's tracking zone and the second location's tracking zone to verify whether the first tracking zone overlaps with the second tracking zone.

4. The method of claim 1, further comprising:
   for each location in the plurality of locations, associating the location with a corresponding influence region having a predefined shape.

5. The method of claim 4, wherein the influence region represents a paintbrush.

6. The method of claim 4, wherein:
   specifying a tracking zone for a location in the plurality of locations based on the location and a previous location in the path comprises specifying a tracking zone that is inside the influence region of the location and outside the influence region of the previous location.

7. The method of claim 1, further comprising:
deleting a portion of the path if a backward motion is detected between the first and second locations, the deleted portion of the path connecting the first location to the second location and including one or more locations in the plurality of locations in the path.

8. The method of claim 7, wherein receiving input specifying a path includes:
receiving two or more input points; and
specifying the plurality of locations in the path based on the two or more input points.

9. The method of claim 8, wherein:
specifying the plurality of locations in the path comprises interpolating between two input points.

10. The method of claim 8, wherein:
receiving two or more input points comprises receiving two or more input points in a two dimensional space.

11. The method of claim 8, wherein:
receiving two or more input points comprises receiving two or more input points in a three dimensional space.

12. The method of claim 7, further comprising:
presenting the path on a surface.

13. The method of claim 7, wherein:
the plurality of locations in the path comprises contiguous raster points.

14. The method of claim 7, wherein:
the first location precedes the second location along the path; and
deleting a portion of the path includes deleting the first location from the path.

15. The method of claim 7, further comprising:
defining a new portion of the path, the new portion replacing the deleted portion.

16. The method of claim 15, further comprising:
specifying a tracking zone for each of one or more new locations along the new portion of the path.

17. The method of claim 15, further comprising:
specifying a new tracking zone for the second location.

18. The method of claim 1, wherein:
receiving input includes receiving user input from a pointing device.

19. A system for processing graphical input, the system comprising:
an interface that receives input specifying a path, the path including a plurality of locations; and
a backward motion detector that specifies a tracking zone for each location in the path based on the location and a previous location preceding the location along the path, and detects a backward motion if two of the specified tracking zones overlap.

20. The system of claim 19, wherein:
the interface comprises a pointing device to generate the input specifying the path.

21. The system of claim 19, further comprising:
a drawing component that corrects the path if a backward motion is detected.

22. The system of claim 21, wherein the interface receives two or more input points, and the drawing component specifies the plurality of locations in the path based on the two or more input points.

23. The system of claim 22, wherein the drawing component interpolates between two input points to specify the plurality of locations in the path.

24. The system of claim 22, wherein the interface receives two or more input points in a two dimensional space.

25. The system of claim 22, wherein the interface receives two or more input points in a three dimensional space.

26. The system of claim 21, wherein the drawing component presents the path on a surface.

27. The system of claim 21, wherein the plurality of locations in the path comprises contiguous raster points.

28. The system of claim 21, wherein the path includes a first location and a second location corresponding to the two of the specified zones, the first location precedes the second location along the path, and the drawing component corrects the path by deleting two or more locations along the path, including the first location.

29. The system of claim 21, wherein the path includes a first location and a second location corresponding to the two of the specified zones, and the drawing component corrects the path by deleting a portion of the path connecting the first location and the second location, and defining a new portion of the path that replaces the deleted portion.

30. The system of claim 29, wherein the backward motion detector specifies a tracking zone for each of one or more new locations along the new portion of the path.

31. The system of claim 29, wherein the backward motion detector specifies a new tracking zone for the second location.

32. The system of claim 19, further comprising:
a non-drawing component receiving a notification from the backward motion detector if a backward motion is detected.

33. The system of claim 19, wherein the path further includes a starting location, and the backward motion detector specifies a tracking zone for the starting location.

34. The system of claim 19, wherein the backward motion detector evaluates the specified tracking zones to verify whether the two of the specified tracking zones overlap.

35. The system of claim 19, wherein each location in the plurality of locations has a corresponding influence region having a predefined shape.

36. The system of claim 35, wherein the influence region represents a paintbrush.

37. The system of claim 35, wherein the backward motion detector specifies, for each location in the path, a tracking zone that is inside the influence region of the location and outside the influence region of the previous location.

38. A system for processing graphical input, the system comprising:
means for receiving input specifying a path including a plurality of locations ordered along the path;
means for specifying a tracking zone for each location in the plurality of locations based on the location and a previous location preceding the location along the path, the tracking zone indicating a direction of the path at the location; and
means for detecting a backward motion between a first and a second location in the path if the first location's tracking zone overlaps with the second location's tracking zone.

39. The system of claim 38, further comprising:
means for deleting a portion of the path if a backward motion is detected between the first and second locations, the deleted portion of the path connecting the first location to the second location and including one or more locations in the plurality of locations in the path.

40. The system of claim 39, further comprising:
means for receiving two or more input points; and
means for specifying the plurality of locations in the path based on the two or more input points.

41. The system of claim 40, wherein the means for specifying the plurality of locations in the path comprises means for interpolating between two input points.

42. The system of claim 40, wherein the means for receiving two or more input points comprises means for receiving two or more input points in a two dimensional space.

43. The system of claim 40, wherein the means for receiving two or more input points comprises means for receiving two or more input points in a three dimensional space.

44. The system of claim 39, further comprising means for presenting the path on a surface.

45. The system of claim 39, wherein the plurality of locations in the path comprises contiguous raster points.

46. The system of claim 39, wherein the first location precedes the second location along the path, and the means for deleting comprises means for deleting the first location from the path.

47. The system of claim 39, further comprising means for defining a new portion of the path, the new portion replacing the deleted portion.

48. The system of claim 47, further comprising means for specifying a tracking zone for each of one or more new locations along the new portion of the path.

49. The system of claim 47, further comprising means for specifying a new tracking zone for the second location.

50. The system of claim 38, further comprising:
means for generating the input specifying the path.

51. The system of claim 38, wherein the path further includes a starting location, the system further comprising means for specifying a tracking zone for the starting location.

52. The system of claim 38, further comprising means for evaluating the first location's tracking zone and the second location's tracking zone to verify whether the first tracking zone overlaps with the second tracking zone.

53. The system of claim 38, further comprising means for associating, for each location in the plurality of locations, the location with a corresponding influence region having a predefined shape.

54. The system of claim 53, wherein the influence region represents a paintbrush.

55. The system of claim 53, wherein the means for specifying a tracking zone comprises means for specifying a tracking zone that is inside the influence region of the location and outside the influence region of the previous location.

56. A software product tangibly embodied in a machine-readable storage device, the software product comprising instructions operable to cause one or more data processing apparatus to perform operations comprising:
receiving input specifying a path including a plurality of locations ordered along the path;
for each location in the plurality of locations, specifying a tracking zone based on the location and a previous location preceding the location along the path, the tracking zone indicating a direction of the path at the location; and
detecting a backward motion between a first and a second location in the path if the first location's tracking zone overlaps with the second location's tracking zone.

57. The software product of claim 56, wherein the path further includes a starting location, the software product further comprising instructions operable to cause one or more data processing apparatus to perform operations comprising:
specifying a tracking zone for the starting location.

58. The software product of claim 56, further comprising instructions operable to cause one or more data processing apparatus to perform operations comprising:
evaluating the first location's tracking zone and the second location's tracking zone to verify whether the first tracking zone overlaps with the second tracking zone.

59. The software product of claim 56, further comprising instructions operable to cause one or more data processing apparatus to perform operations comprising:
for each location in the plurality of locations, associating the location with a corresponding influence region having a predefined shape.

60. The software product of claim 59, wherein the influence region represents a paintbrush.

61. The software product of claim 59, wherein:
specifying a tracking zone for a location in the plurality of locations based on the location and a previous location in the path comprises specifying a tracking zone that is inside the influence region of the location and outside the influence region of the previous location.

62. The software product of claim 56, further comprising instructions operable to cause one or more data processing apparatus to perform operations comprising:
deleting a portion of the path if a backward motion is detected between the first and second locations, the deleted portion of the path connecting the first location to the second location and including one or more locations in the plurality of locations in the path.

63. The software product of claim 62, wherein receiving input specifying a path includes:
receiving two or more input points; and
specifying the plurality of locations in the path based on the two or more input points.

64. The software product of claim 63, wherein:
specifying the plurality of locations in the path comprises interpolating between two input points.

65. The software product of claim 63, wherein:
receiving two or more input points comprises receiving two or more input points in a two dimensional space.

66. The software product of claim 63, wherein:
receiving two or more input points comprises receiving two or more input points in a three dimensional space.

67. The software product of claim 62, further comprising instructions operable to cause one or more data processing apparatus to perform operations comprising:
presenting the path on a surface.

68. The software product of claim 62, wherein:
the plurality of locations in the path comprises contiguous raster points.

69. The software product of claim 62, wherein:
the first location precedes the second location along the path; and
deleting a portion of the path includes deleting the first location from the path.

70. The software product of claim 62, further comprising instructions operable to cause one or more data processing apparatus to perform operations comprising:
defining a new portion of the path, the new portion replacing the deleted portion.

71. The software product of claim 70, further comprising instructions operable to cause one or more data processing apparatus to perform operations comprising:
specifying a tracking zone for each of one or more new locations along the new portion of the path.

72. The software product of claim 70, further comprising instructions operable to cause one or more data processing apparatus to perform operations comprising:
specifying a new tracking zone for the second location.

73. The software product of claim 56, wherein:
receiving input includes receiving user input from a pointing device.

* * * * *

UNITED STATES PATENT AND TRADEMARK OFFICE
CERTIFICATE OF CORRECTION

| | | |
|---|---|---|
| PATENT NO. | : 7,609,278 B1 | Page 1 of 1 |
| APPLICATION NO. | : 10/633436 | |
| DATED | : October 27, 2009 | |
| INVENTOR(S) | : Dash | |

It is certified that error appears in the above-identified patent and that said Letters Patent is hereby corrected as shown below:

On the title page,

[*] Notice: Subject to any disclaimer, the term of this patent is extended or adjusted under 35 U.S.C. 154(b) by 1223 days.

Delete the phrase "by 1223 days" and insert -- by 1723 days --

Signed and Sealed this

Twentieth Day of July, 2010

David J. Kappos
*Director of the United States Patent and Trademark Office*